United States Patent

Kobayashi

[15] 3,651,491

[45] Mar. 21, 1972

[54] MEMORY DEVICE HAVING COMMON READ/WRITE TERMINALS

[72] Inventor: Akira Kobayashi, Tokyo, Japan

[73] Assignee: Nippon Electric Co., Ltd., Tokyo, Japan

[22] Filed: Oct. 22, 1970

[21] Appl. No.: 82,988

[30] Foreign Application Priority Data

Oct. 25, 1969 Japan....................................44/85355

[52] U.S. Cl..............................340/174 FF, 307/238, 330/12

[51] Int. Cl.......................G11c 11/40, G11c 7/00, G11c 5/02

[58] Field of Search......................340/173 FF, 173 R, 174 R; 330/12, 69; 307/238

[56] References Cited

UNITED STATES PATENTS

| | | | |
|---|---|---|---|
| 3,251,044 | 5/1966 | Robinson et al. | 340/174 R |
| 3,283,313 | 11/1966 | Hathaway | 340/174 R |
| 3,413,618 | 11/1968 | Shuba | 340/174 R |
| 3,471,838 | 10/1969 | Ricketts, Jr. et al. | 340/174 R |
| 3,178,592 | 4/1965 | Fischer et al. | 340/173 FF |

OTHER PUBLICATIONS

IBM Technical Disclosure Bulletin " Simultaneous Read-Write Monolithic Storage Cell" by Berding, Vol. 13, No. 3; 8/70, P. 620

*Primary Examiner*—Stanley M. Urynowicz, Jr.
*Attorney*—Sandoe, Hopgood & Calimafde

[57] ABSTRACT

A memory device, such as for use in a digital computer or the like, comprises a plurality of memory circuits arranged in a plurality of intersecting rows and columns to thereby form a memory matrix. Each of the memory circuits has common read-write terminals respectively connected to a pair of digit signal lines and a terminal for receiving a selection pulse. A memory section of the memory read-out circuit is coupled to each pair of digit signal lines. During a write operation one of the pair of digit lines has a write pulse produced thereon. The section stores information as to which of the digit lines the write pulse was applied until the write pulse has decreased to a negligible level. The output on the other digit signal line, that is, the digit line having no write pulse thereon, controls the production of a read-out signal at the memory output, As a result, a read-out operation may be performed on the memory immediately following a write operation.

7 Claims, 6 Drawing Figures

INVENTOR
Akiro Kobayashi
by
Sandoe, Hopgood & Calimafde
ATTORNEYS

INVENTOR
Akiro Kobayashi
by
Sandoe, Hopgood & Calimafde
ATTORNEYS

MEMORY DEVICE HAVING COMMON READ/WRITE TERMINALS

This invention relates generally to memory devices, and more specifically to a memory device comprising a memory circuit having a pair of common terminals for use in data write-in and readout operations.

In general, a memory of the type described above includes a plurality of memory circuits, a plurality of digit drive circuits, and a plurality of readout circuits. In addition, a suitable number of memory circuits are provided for each digit drive circuit and readout circuit. The individual memory circuits are connected to an address selection circuit by means of which the desired memory circuit is selected for either the insertion or writing of new data into the selected circuit, or a reading out of data from that circuit. Each memory circuit has a pair of terminals used in common for writing and readout purpose, and the mating terminals are connected to each other, to thereby form a pair of digit signal lines. The input side of the digit drive circuit is connected to the write information source for providing the information to be written into the memory circuit selected by the selection circuit, and is also connected to the write command pulse source for providing a write command for a write-in operation. The output side of the digit drive circuit is connected to a pair of digit signal lines. The input side of the read circuit is connected to a pair of digit signal lines, and the output side of the read circuit is connected to a device for utilizing the information read out from the selected memory circuit.

In this memory, writing of new information is performed in the following manner. Assume that a write command pulse and a signal of one bit of the binary information to be written into this memory are applied concurrently to the digit drive circuit. As a result, a write pulse is produced in a pair of digit signal lines corresponding to the given binary information. A selection or address pulse is applied to one of the memory circuits connected to this pair of digit signal lines, to thereby write the information into this selected memory circuit. One bit of binary code information corresponding to the given information is thus written and stored in the selected memory circuit. Reading out of information from the memory is performed in the following manner. A complementary signal corresponding to one bit of stored binary information is produced in a pair of digit signal lines connected to a pair of write/read common terminals of the memory circuit to which the selection pulse has been applied. This pair of read signals is applied to the read circuit, whereby the information stored in the selected memory circuit is read out.

In this conventional memory device, the so-called write access time (i.e., the time interval necessary to permit reading out of information after writing) is relatively long and thus limits the operating speed of the memory, since the same digit signal line is used in common for both write-in and readout operations.

More specifically, the write pulse applied to the digit signal line in order to write information into the memory circuit in the write operation is very large (i.e., the write pulse is more than 100 times larger than the read pulse,) and a considerably large access time is thus required to permit readout operation after the write pulse has been once produced and then attenuated below the read signal level.

In the conventional memory, such as that described in a paper entitled "Low Power Computer Memory Device," pages 381 through 393, presented at the 1967 Fall Joint Computer Conference, it is impossible to begin a readout operation until the write pulse produced during a write operation is attenuated to a negligible degree as compared to the read signal level when a writing procedure is followed by a readout operation. In other words, the write access time serves as a significant factor to limit the operating speed of this memory device. According to the memories of this type known to the prior art, therefore, there is a limitation in reducing the memory cycle time, or a desirably small memory cycle time could have hardly been realized.

It is an object of this invention to provide a memory device permitting a readout operation during the attenuation of the write pulse, or before the disappearance of the write pulse.

It is a further object of the invention to provide a memory device having a lower memory cycle time as compared to prior art memory devices of this type.

The memory device according to this invention comprises a digit drive circuit for generating a write pulse in a pair of digit signal lines when signals are received from the write command pulse source and the source of the information to be written into the memory. A memory circuit includes write/read common terminals to which the digit signal lines and the word selection lines connected to the selection pulse source are connected. A memory means connected to the pair of digit signal lines stores the operation history of the digit drive circuit, and a read circuit controlled by the content of the memory means operates to amplify the read signal produced in one of the pair of digit signal lines corresponding to the content of the memory means.

In the memory device of this invention, the digit drive circuit generates a write pulse in one of the pair of digit signal lines in a write operation corresponding to the information to be written. The memory means of the readout circuit coupled to the other digit signal line having no write pulse impressed thereon stores the operation history of that digit drive circuit until the write pulse vanishes. A pair of read signals produced by the memory circuit in a pair of digit signal lines at the read operation are taken out of the other digit signal line in which no write pulse has been produced, according to the information stored in the memory means. The read circuit is thus operable free of undesirable influence due to the presence of the write pulse.

In the memory device of this invention, therefore, normal readout can be performed during the resetting of the write operation, so that the memory cycle time can be significantly reduced.

To the accomplishment of the above and to such further objects as may hereinafter appear, the present invention relates to a memory device having common read/write terminals, substantially as defined in the appended claims, and as described in the following specification taken together with the accompanying drawings in which:

Figure 1:
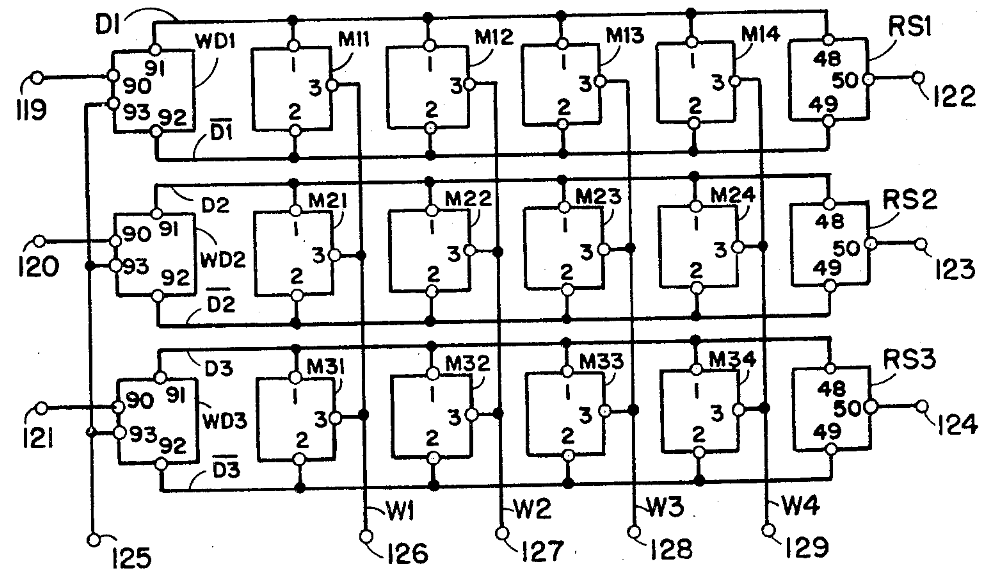
FIG. 1 is a block diagram of a memory device illustrating the principles of the invention.
Figure 2:
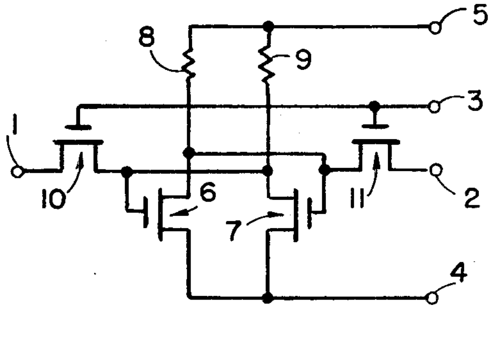
FIG. 2 is a circuit diagram of a memory circuit used in the memory device as in FIG. 1.

FIG. 1 is a block diagram showing a memory device describing the operating principles of the memory device of this invention in which the power terminals are omitted for purposes of simplifying the description. The memory device shown in FIG. 1 comprises a plurality of memory circuits, M11–M14, M21–M24 and M31–M34, each of which stores one bit of a binary signal. An example of these memory circuits is illustrated in FIG. 2, and the memory circuits of FIG. 1 constitute a four-row and three-column memory matrix, and therefore a memory device capable of storing four words, three-bits per word. In other words, the memory circuits M11, M21 and M31 are able to store one word. Similarly the memory circuits M13, M23 and M33 also store one word, and memory circuits M14, M24 and M34 store another word. The memory circuits M11 through M14 store the corresponding bits of each word. Similarly memory circuits M21–M24, as well as memory circuits M31–M34 store corresponding bits of the stored words. Each memory circuit is provided with a pair of digit signal read/write common terminals 1 and 2 for receiving a pair of complementary write pulses and for supplying a readout signal to an external device (not shown) so that readout and write-in operations may be performed. Each memory circuit is also provided with a selection terminal 3 for supplying a selection pulse to the desired or addressed memory circuit. The individual digit signal write/read common terminals 1 of the corresponding bits of words are connected to each other, thereby forming a digit signal line. In the same way, the digit signal write/read common terminals 2 are connected to each other to form another digit signal line. For example, all the digit signal write/read terminals 1 of the memory circuits M11–M14 are connected to the digit signal line D1, and all the digit signal write/read terminals 2 are connected to the digit signal line $\overline{D1}$ (FIG. 1). Selection terminals 3 of each memory circuit forming one word are connected to each other to form a word selection line, and word selection lines corresponding to each word are connected to the selection terminals 126–129, respectively, which receive the word selection pulse thereat. For example, the selection terminals 3 of the memory circuits M11, M21 and M31 are all connected to the word selection line W1, which in turn is connected to the selection terminal 126. Digit drive circuits WD1–WD3 supply write pulses to the three groups of the memory circuits provided for the corresponding bits of each word, respectively.

Figures 3, 5:
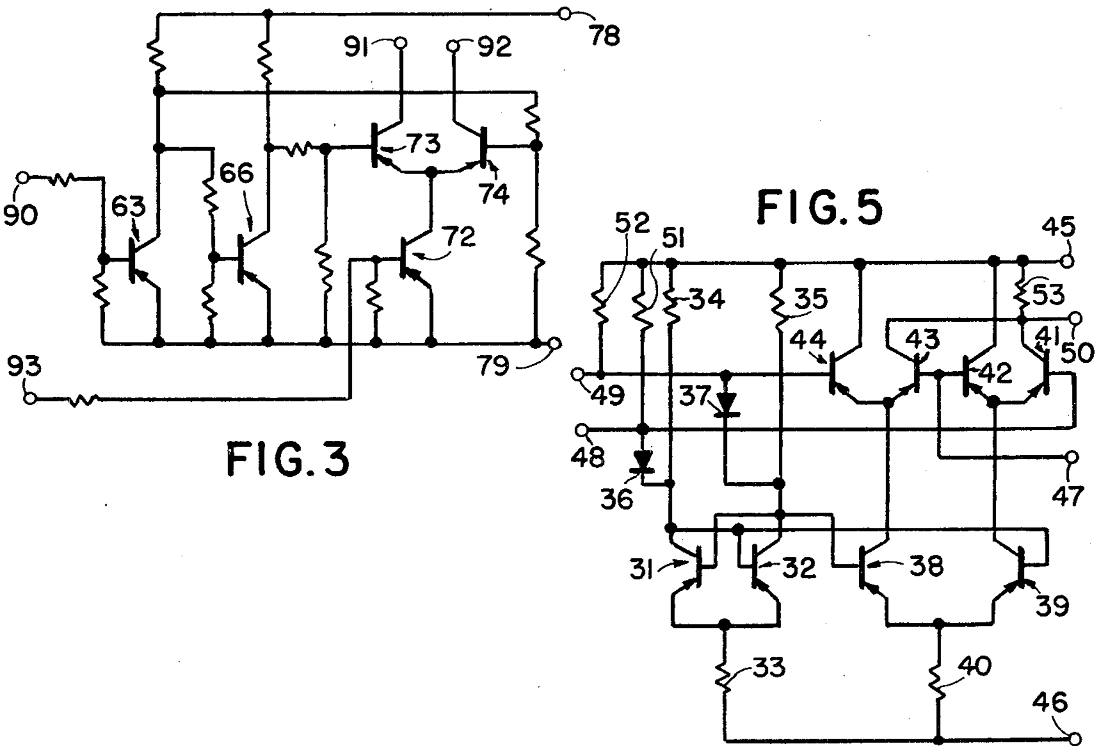
FIG. 3 is a circuit diagram showing the digit drive circuit used in the memory device of FIG. 1.
FIG. 5 is a circuit diagram showing the read circuit used for the memory device embodying this invention.

An example of this digit drive circuit is shown in FIG. 3. Each digit drive circuit is provided with a digit signal input terminal 90 for receiving a binary signal of the information to be written, and is also provided with a write command pulse input terminal 93 for receiving the write command pulse for initiating a write-in operation. Each digit drive circuit is further provided with a pair of digit signal supply terminals 91 and 92 for supplying a write pulse to one of a pair of digit signal lines corresponding to the information to be applied to the digit signal input terminal 90 when a write command pulse is supplied to the write input terminal 93. The digit signal input terminals 90 of the individual digit drive circuits are connected to the respective sources of the information to be written by way of the input terminals 119, 120 and 121 (FIG. 1) to which the information to be written in the respective memory circuits is applied. The write command pulse input terminals 93 of the individual digit drive circuits are connected to each other and are further connected to the terminal 125 which is to receive the write command pulse. Read circuits RS1 through RS3 read the stored contents from the three groups of memory circuits, respectively, provided for the corresponding bits of each word.

Figure 4:
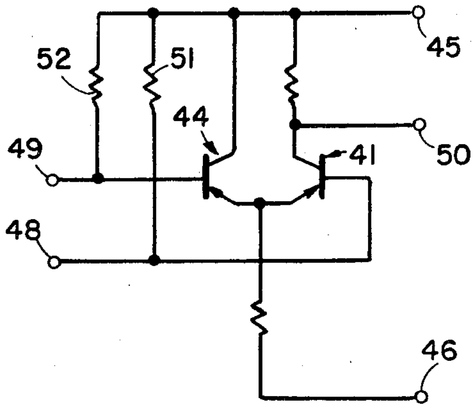
FIG. 4 is a circuit diagram showing a typical read circuit used in a conventional memory device.

An example of a known readout circuit is shown in FIG. 4, and a readout circuit used for the memory device of this invention is shown in FIG. 5. Each digit readout circuit is provided with a pair of signal input terminals 48 and 49 for receiving a pair of readout signals expressed by a binary signal, and with a signal output terminal 50 coupled to output terminals 122, 123 and 124 respectively for supplying the read information to the external device.

In the memory device arranged as above, a word selection pulse is supplied to one of the selection terminals 126–129 in order to select the desired word when information is to be written into or read out from the memory. In this memory device, the polarity of the word selection pulse may either be negative or positive.

If it is assumed that a word consisting of memory circuits M11, M21 and M31 is selected, then the word selection pulse is applied to the selection terminal 126. The explanation of the memory device will be given in the case of the writing of new binary information therein. During the period when the selection pulse is applied to the selection terminal, a write pulse is supplied to one of each pair of digit signal lines from each of the digit drive circuits WD1, WD2, and WD3, whereby the information is stored in the selected memory circuit. For this purpose, a write command pulse is applied to the terminal 125 to drive all digit drive circuits WD1, WD2 and WD3. The polarity of this write command pulse may be either negative or positive. A voltage signal is supplied to each of the input terminals 119, 120 and 121, corresponding to the information to be written therein. This voltage may be determined to a low voltage when the information is a binary signal 1, and to be a high voltage when it is a binary signal 0, or vice versa. The information voltage may be so arranged that when a write command pulse is supplied to the digit drive circuit, the write pulse is applied to one of each digit signal lines (for example, D1, D2 and D3) when the input terminal stands at a low voltage, and the write pulse is applied to the other one of the digit signal lines (for example, D1, D2 and D3) when the input terminal stands at a high voltage, or vice versa. The value of the voltage of the digit signal line in the case that neither a write pulse nor a readout signal is applied to this digit signal line is determined to be suitable in relation to the memory circuit, digit drive circuit and readout circuit.

When the content of the memory circuit is read out, the selection pulse is supplied to the selection terminal whereby a readout signal is generated in one or both of a pair of digit signal lines. When the memory content is a binary signal 1, a readout signal of the lower voltage is developed at one of the digit signal lines (for example, D1, D2 and D3), and a read signal of the high voltage is developed at the other of the digit signal lines (for example, $\overline{D1}$, $\overline{D2}$, and $\overline{D3}$). When the memory content at the selected memory circuit is a binary signal 0, a read signal of the high voltage is developed at one of the digit lines, and a read signal of the low voltage is developed at the other digit line. This arrangement may be reversed with respect to the voltage applied to the input terminal for 0 and 1 binary signals. When a pair of such readout signals are supplied to the signal readout circuits RS1, RS2 and RS3, a voltage corresponding to the content stored in each memory circuit is produced at each output terminal. This voltage may be of a low value when the binary signal stands at 1, or of a high value when it is 0, or vice versa.

A write and readout operation of the memory device described above is now explained in detail. Assume that an information (1, 0, 1) is written in the word consisting of memory circuits M11, M21 and M31.

In this case, a word selection pulse of negative polarity is applied to the selection terminal 126, and a write command pulse of negative polarity is applied to the terminal 125. At the same time, a signal of negative polarity corresponding to the binary signal 1 is applied to the input terminals 119 and 121, and a signal of positive polarity corresponding to the binary signal 0 is applied to the input terminal 120. As a result, the digit drive circuit WD1 generates a write pulse of positive polarity in the digit signal line D1, and the digit drive circuit WD2 generates a write pulse of positive polarity in the digit signal line $\overline{D2}$. At the same time, the digit drive circuit WD3 generates a write pulse of positive polarity in the digit signal line D3. These write pulses are supplied to the digit signal write/read common terminal 1 of the memory circuit M11, digit signal write/read common terminal 2 of the memory circuit M21, and digit signal write/read common terminal 1 of the memory circuit M31, respectively. No write pulse is applied to any other digit signal line. Thus an information word (1, 0, 1) is stored in the memory circuits M11, M21 and M31. While the write pulse is also applied to the memory circuits M12–M14, M22–M24, and M32–M34, no word selection pulse is supplied thereto. Therefore, no information is written into these memory circuits during this writing operation and remain in their initial state. The performance of a writing operation into other memory circuits is substantially the same as that described above except that the word selection pulse is supplied to the corresponding different selection terminal.

A readout operation wherein the stored memory content (0, 1, 1) is read out of the memory circuits M12, M22 and M32 will be explained below to illustrate a readout operation on the memory device of the invention.

A word selection pulse of negative polarity is applied to the selection terminal 127. As a result, a high-voltage readout signal is produced in the digit signal line $\overline{D1}$, a low-voltage readout signal is produced in the digit line D1, a low-voltage readout signal is produced in the digit signal line $\overline{D2}$, a high-voltage readout signal is produced in the digit signal line $\overline{D2}$, a high-voltage readout signal is produced in the digit signal line D2, a low-voltage readout signal is produced in the digit signal line $\overline{D3}$, and a high-voltage readout signal is produced in the digit signal line D3. By means of these readout signals, the information (0, 1 1) is obtained from the readout circuits RS1, RS2 and RS3, and a high voltage, a low voltage, and a low voltage are respectively generated at the output terminals 122, 121 and 124, corresponding to the stored information (0, 1 1). No description is believed necessary for reading out stored information from other memory circuits since the operation is the same as that described above, except that the word selection pulse is applied to the corresponding selection terminal.

FIG. 2 shows an example of the memory circuits of FIG. 1, each having two digit signal write/read common terminals 1 and 2 and consisting mainly of P-channel MOS transistors. The circuit further includes power terminals 4 and 5. When the terminal 4 is at 0 v., the terminal 5 normally stands at about −15 v. A flip-flop circuit composed of MOS transistors 6 and 7, and resistors 8 and 9 respectively coupled between terminal 5 and transistors 6 and 7, has two stable states; one in which transistor 6 is ON and transistor 7 is OFF, and the other in which transistor 7 is ON and transistor 6 is OFF. The former state will hereinafter be referred to as the 1 state, and the latter as the 0 state. The MOS transistors 10 and 11, having their source-drain circuits respectively connected between common terminals 1 and 2 and the gates of transistors 6 and 7, serve as the gates through which the state of the flip-flop is read and set (or written). In order to reset the 1 state (where MOS transistor 6 is ON and transistor 7 is OFF) into the 0 state (where MOS transistor 6 is OFF and transistor 7 is ON), it is necessary that a negative polarity selection pulse of an amplitude of about 10 v. is applied to the selection terminal 3 coupled to the gates of transistors 10 and 11, and which is normally held at about 0 v., and a write pulse having a peak value of about 0 v. is applied to the terminal 1, which along with terminal 2 is normally held at about −10 v. To reset the 0 state to the 1 state, the write pulse is applied to the terminal 2 instead of terminal 1. For a readout operation, a negative polarity selection pulse whose amplitude is about 10 v. is applied to the selection terminal 3 as in the write operation. When the memory circuit is in the 1 state, current flows from the terminal 2 to a readout amplifier (which will be described later) via the MOS transistors 6 and 11. When the memory circuit is in the 0 state, current flows from the terminal 1 to the readout amplifier. This current is converted into a voltage by the readout circuit. Thus the voltage of the digit signal line in which the current flows becomes $V_D+\Delta V_D$, and the voltage of the digit signal line in which no current flows remains at $V_D$. In other words, the digit signal write/read common terminals 1 and 2 are the terminals to which the write pulse for writing the information 0 and 1 is applied, and from which the readout current is taken out during a readout operation.

FIG. 3 is a diagram of the digit drive circuits WD1–WD3 of the memory device of FIG. 1. Each digit drive circuit comprises a first power terminal 78 supplied with a negative voltage, and a second power terminal 79 which is held at 0 v. When, for example, a low-level signal is applied to the digit signal input terminal 90, transistor 63 is ON and transistor 66 is OFF. The base of the transistor 74 stands at nearly 0 v., and the base of the transistor 73 stands at a negative voltage. In such state, when a negative polarity pulse is applied to the write command pulse input terminal 93, the transistors 72 and 73 become conductive, current flows in the terminal 91, and a positive write pulse is produced in the digit signal line D1 connected to the terminal 91. When a high-level signal is applied to the digit signal input terminal, the transistor 63 is nonconductive and transistor 66 is conductive. When a negative pulse is applied to the write command pulse input terminal 93, the transistors 72 and 74 become conductive, and a positive write pulse is produced in the other digit line $\overline{D1}$ connected to the terminal 92.

FIG. 4 is a circuit diagram showing an example of the digit signal readout circuit used in a conventional memory device. In FIG. 4, one of the simplest digital signal readout circuits is shown. Practically, however, a signal readout circuit as described in the foregoing paper is generally used in conventional memory devices and includes input terminals 48 and 49, respectively connected to the first and second digit signal lines. The terminal 50 is a signal output terminal, and 45 and 46 are voltage supplying terminals. For example, the terminal 45 is connected to a voltage source whose voltage is equal to the digit signal line voltage $V_D$, and the terminal 46 is held at 0 volts. Resistors 51 and 52, respectively coupled to the bases of transistors 41 and 44, convert current into voltage. The current flowing in the first digit signal line D or second digit signal line $\overline{D}$ during a write or readout operation is converted into a voltage through these resistors. When the read output current flows in the digit signal line, the digit signal line is held at a high voltage of $V_D+\Delta V_D$. When no current flows therein, the digit signal line is held at a voltage $V_D$. The transistors 41 and 44 are connected differentially in the circuit, and their bases are connected to the first and second digit signal lines D and $\overline{D}$ respectively. Thus, when a pair of read output signals are produced in the first and second digit signal lines D and $\overline{D}$ during a readout operation, the transistor connected to the digit signal line with a high voltage of $V_D+\Delta V_D$ turns off, and the transistor connected to the digit signal line with a low voltage of $V_D$ turns on, whereby the corresponding signals are generated at the signal output terminal 50. When the content 1 is read out from the memory circuit, a voltage higher by $\Delta V_D$ than that of the second digit signal line $\overline{D}$ is produced in the first digit signal line D. Therefore, the transistor 44 turns on, and transistor 41 turns off. As a result, the voltage at the signal output terminal 50 becomes equal to $V_D$ which is applied to the terminal 45 (namely, the low voltage), and thus the content 1 of the selected memory circuit is read out. When the content 0 is read out from the memory circuit, the second digit signal line $\overline{D}$ stands at a voltage higher by $\Delta V_D$ than the first digit signal line D. As a result, the transistor 44 turns off, transistor 41 turns on, the voltage at the signal output terminal 50 becomes higher than $V_D$, and the content 0 is read out from the memory circuit.

Generally, in the memory device such as described above, readout and write operations are done alternately. In other words, a write operation is done prior to a readout operation. A positive write pulse whose amplitude is large is applied to one of the first and second digit signal lines when a write operation is intended. This pulse, as shown in FIG. 1, is also applied to the readout circuit.

This means that in the prior art memory, a readout operation following a write operation is not available until the write pulse produced during the write operation is attenuated and the voltage across the first and second digit signal lines becomes below $\Delta V_D$. The electrostatic capacity between the digit signal line and the power source is, however, generally fairly large, depending upon the structure of the digit signal line and the load characteristic of the terminals 1 and 2 of the memory circuit. The charge of the electrostatic capacity by the write pulse is discharged through the input resistor 51 or 52 of the readout circuit. Therefore, a considerable length of time is required for the voltage between the digit signal lines to decrease below $\Delta V_D$.

In short, according to the prior art, a readout operation is not available unless the write pulse produced during the write operation is attenuated to a negligible value compared with the read signal produced during the readout operation. Whereas, in the memory device of this invention, the readout operation is available immediately following a write operation before the write pulse produced during the write operation is attenuated to a negligible value compared with the read signal produced at the read operation. To this end, a readout circuit, as shown in FIG. 5, is employed in the memory device of this invention.

The readout circuit of FIG. 5, corresponding to circuits RS1, RS2 and RS3 of FIG. 1, comprises input terminals 48 and 49 connected to the first and second digit signal lines respectively, a signal output terminal 50, and voltage supply terminals 45, 46, and 47. A voltage equal to $V_D$ is applied to terminal 45, a voltage slightly higher than $V_D$ is applied to terminal 47, and a voltage of 0 v. is applied to terminal 46. Resistors 51 and 52 coupled to terminal 45 convert the current flowing in the first and second digit signal lines during write-in and readout operations into a corresponding voltage.

The transistors 31, 32, diodes 36, 37, and resistors 33, 34 and 35 constitute a flip-flop circuit. When a write pulse is applied to terminal 48 the transistor 31 turns on and transistor 32 turns off. As a result, the base of the transistor 38 stands at a lower potential than the base of the transistor 39. When a write pulse is applied to the terminal 49, the base of the transistor 38 stands at a higher potential than the base of the transistor 39. This state is held until the next write pulse is applied.

The transistors 38 and 39 and resistor 40 form a current switching circuit. When a write pulse is applied to the terminal 48, the transistor 38 turns on. When a write pulse is applied to the terminal 49 the transistor 39 turns on. The transistors 41 and 42 and resistor 53 form an amplifier circuit in which the read output signal supplied to the terminal 48, namely, the read output signal produced in the first digit signal line at the readout operation, is amplified.

The transistors 43, 44 and resistor 53 constitute an amplifier in which the read output signal applied to the terminal 49, namely the read output signal produced in the second digit signal line at the readout operation is amplified.

When a write pulse produced during a write operation is applied to the first digit signal line, the flip-flop circuit is set so that current is supplied via the terminal 48 to the amplifier circuit made up of transistors 43 and 44. As a result, this amplifier is made operative, and the amplifier circuit formed by the transistors 41 and 42 is made inoperative. Accordingly, the write pulse applied to the first digit signal line in the write operation has no relation to the readout operation, and the output signal appearing in the second digit signal line at the readout operation is concerned only with the readout operation. When a write pulse is applied to the second digit signal line, the amplifier circuit formed by the transistors 41 and 42 is made operative, and only the output signal appearing in the first digit signal line during the readout operation is involved in the readout operation.

Figure 6:
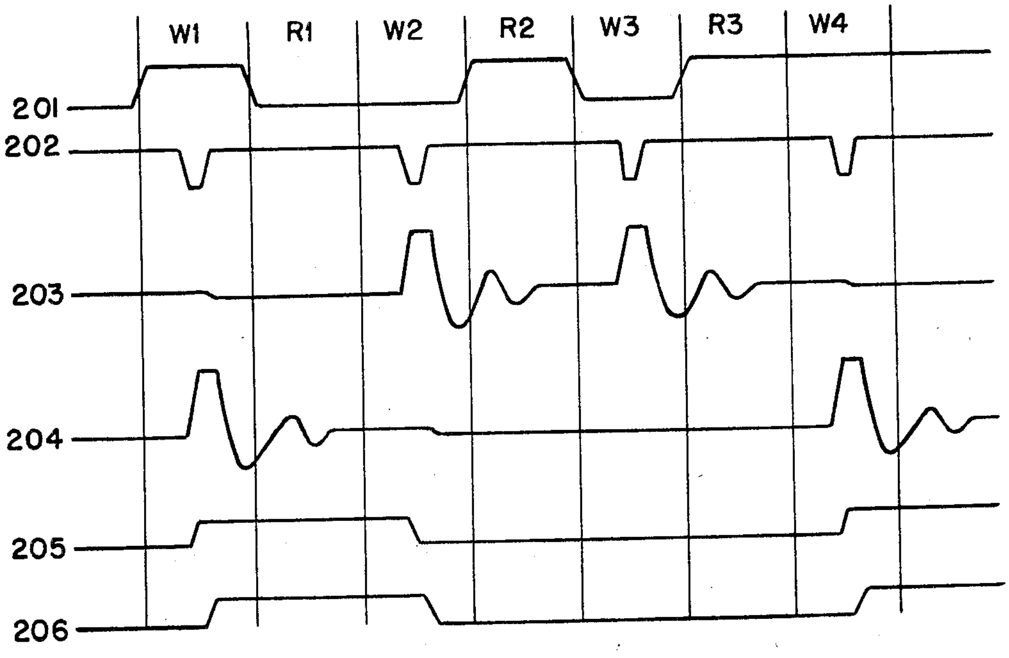
FIG. 6 is a waveform diagram showing the operation of the read circuit of FIG. 5.

FIG. 6 shows voltage waveforms developed at selected points of the memory device of this invention during write and readout operations. W1, W2, W3, and W4 indicate each cycle of a write operation, and R1, R2, R3, and R4 indicate each cycle of a readout operation.

Pulse waveforms 201 of the information to be written into the memory device are applied to the digit signal input terminal 90 of each digit drive circuits WD1, WD2 and WD3 of FIG. 3, and the write command pulses 202 are applied to the write command pulse input terminal 93 of each digit drive circuits WD1, WD2 and WD3. Voltages 203 and 204 appear at first digit signal lines (for example, D1, D2 and D3) and at second digit signal lines (for example, $\overline{D1}$, $\overline{D2}$, and $\overline{D3}$), respectively. The read signals appearing at the terminals 48 and 49 during a readout operation are of mutually reverse phase. To make the output signals appearing at the signal output terminal 50 in phase, the required phase adjustment is accomplished in the amplifier circuit.

As shown in FIG. 6, a waveform 205 appears at the collector of the transistor 32 which constitutes a flip-flop circuit, and an output signal waveform 206 phase shifted with respect to waveform 205 appears at the signal output terminal 50.

A general object of the invention has been described above in connection with one specific embodiment wherein a readout operation may be carried out even during a write reset operation. By the use of the memory device of this invention, therefore, the efficiency and speed of operation of the memory device can be markedly improved.

While an embodiment of the invention has been herein illustrated and described in detail, it is to be understood that the invention is not intended to be limited thereto. For example, any type of memory circuit may be used for the memory device of this invention if that memory circuit has a selection terminal and a pair of write/read common terminals. One example of an alternative memory circuit of this type is described in "Low Power Computer Memory System," FIG. 1 on page 382, presented at the 1967 Fall Joint Computer Conference. Also, in the above-described embodiment, MOS field effect transistors are used in the memory circuit. Instead of field effect transistors, other types of transistors or elements such as Esaki diodes may be used. The memory circuit of this invention need not necessarily be of the word array type to form a memory device as shown in FIG. 1. A memory device of the current coincidence type as shown in the above report may also be formed and employed in the memory device of the invention. The memory circuit of this invention is not necessarily of the nondestructive type; instead, a memory circuit of the destructive type may be employed. In the latter case, it will be noted that a provision for a rewrite operation must be used.

The digit drive circuit used for the memory device of this invention is not limited to the one shown in FIG. 3. Any type of digit drive circuit may be used with which a write pulse is produced in one of the first and second digit signal lines D and $\overline{D}$, corresponding to the information to be written into the memory device. One example of an alternate digit drive circuit that may be used for the purpose of this invention is shown at page 387 of the foregoing report.

The signal readout circuit used for the memory device of this invention need not be limited to the one shown in FIG. 5. Instead, a memory circuit using flip-flop circuits or monostable circuits may be used, or a blocking oscillator and the like may be used, if only such memory circuit is operated by the write pulse produced during the write operation and is able to store the information as to which digit signal line the write pulse was applied until the level of the write pulse is attenuated to a negligible value as compared to the read signal produced during the read operation. As shown in FIG. 5, the gate circuit of the current switching type provided in the signal readout circuit is not connected directly to the digit signal line. However, this gate circuit may be connected directly to the digit signal line, or may be of the voltage switching type. Also, as shown, the emitters of the transistors in the readout circuit are connected in common. Instead, if desired, other connections may be employed. In the embodiment of the invention herein shown, a transistor is used for the current switching type gate circuit, although a diode may also be used for that purpose.

Thus while only a single embodiment of the present invention has been herein specifically described, it will be apparent that modifications may be made therein without departing from the spirit and the scope of the invention.

I claim:

1. A memory device comprising a memory matrix including a plurality of memory circuits arranged in *m*-rows and *n*-columns, each of said memory circuits having a pair of write/read common terminals used for writing and reading out an information signal and also having a selection terminal for receiving a selection signal when information is readout or written into one of said memory circuits, *m*-pairs of digit signal lines connected respectively to said pair of write/read common terminals of each of said memory circuits of each row, *n* numbers of selection lines connected respectively to the selection terminal of each of said memory circuits in each column; *m* digit signal write circuits each having at least one terminal to which a write command pulse is supplied when an information signal is written in said memory matrix and also having a pair of terminals connected respectively to a pair of said digit signal lines for supplying the write pulse to one of said digit signal lines corresponding to the information signal to be written; memory means respectively connected to each pair of said digit signal lines and operated by the write pulse supplied to one of said pairs of digit signal lines for storing information as to which of said pair of digit signal lines has a write pulse applied thereon at least until the write pulse significantly decreases in level, and means for selecting one of a pair of said digit signal lines so that a read output on the digit signal line in which no write pulse is present corresponding to the information stored in said memory means is obtained during a readout operation.

2. The memory device of claim 1, further comprising a matrix output terminal, and *m* readout circuits including said memory means and coupled to said output terminal, each of said readout circuits having means for amplifying the read output signal produced in the selected one of said digit signal lines, said readout circuit being effective to read out the content of the selected memory circuit to said output terminal.

3. The memory device of claim 2, in which said amplifying means comprises first and second amplifiers each coupled to said output terminal, and further including means coupled to said memory means for selectively operating one of said first and second amplifiers in response to which of said digit signal lines has said write pulse thereon.

4. The memory device of claim 3, in which said selective operating means comprises first and second switching means respectively coupled to said first and second amplifiers and to said memory means.

5. The memory device of claim 4, in which said memory device comprises a circuit having two stable states, and first and second control terminals respectively coupled to said pair of digit signal lines.

6. The memory device of claim 1, in which said memory circuits each comprise first and second switching devices having an output coupled respectively to said write/read common terminals, and a control terminal coupled to said selection terminal.

7. The memory device of claim 6, in which said memory circuits each further comprises third and fourth switching devices coupled to one another to form a bistable circuit and having control terminals respectively coupled to an output electrode of said first and second switching devices.

* * * * *